(12) United States Patent
Perelman et al.

(10) Patent No.: US 11,822,700 B2
(45) Date of Patent: Nov. 21, 2023

(54) METHOD AND SYSTEM TO MAINTAIN THE INTEGRITY OF A CERTIFIED DOCUMENT WHILE PERSISTING STATE IN A DYNAMIC FORM

(71) Applicant: ADOBE INC., San Jose, CA (US)

(72) Inventors: Roberto Perelman, Sunnyvale, CA (US); Christopher T. Solc, Ontario (CA); Anatole A. Matveief, San Jose, CA (US); Jeff Young, County Louth (IE); John P. Brinkman, Ontario (CA)

(73) Assignee: Adobe Inc., San Jose, CA (US)

(*) Notice: Subject to any disclaimer, the term of this patent is extended or adjusted under 35 U.S.C. 154(b) by 984 days.

(21) Appl. No.: 16/052,411

(22) Filed: Aug. 1, 2018

(65) Prior Publication Data

US 2018/0341787 A1 Nov. 29, 2018

Related U.S. Application Data

(63) Continuation of application No. 11/583,410, filed on Oct. 18, 2006, now Pat. No. 10,068,107.

(51) Int. Cl.
*G06F 21/64* (2013.01)
*G06F 40/174* (2020.01)
*G06F 40/186* (2020.01)

(52) U.S. Cl.
CPC ........... *G06F 21/64* (2013.01); *G06F 40/174* (2020.01); *G06F 40/186* (2020.01)

(58) Field of Classification Search
CPC ......... H04L 9/32; H04L 63/12; H04L 63/123; H04L 63/126; H04L 67/10; H04L 67/104; H04L 9/3247; G06F 21/10; G06F 21/60; G06F 21/64; G06F 21/6218; G06F 40/103; G06F 40/106; G06F 40/117; G06F 40/143; G06F 40/166; G06F 40/174; G06F 40/177; G06F 40/186
See application file for complete search history.

(56) References Cited

U.S. PATENT DOCUMENTS

| | | | |
|---|---|---|---|
| 6,505,193 B1 | 1/2003 | Musgrave et al. | |
| 6,651,217 B1 | 11/2003 | Kennedy et al. | |
| 7,188,176 B1 | 3/2007 | Nedderman et al. | |
| 7,197,515 B2 | 3/2007 | Rivers-Moore et al. | |
| 7,233,942 B2 | 6/2007 | Nye | |
| 7,500,178 B1 | 3/2009 | O'Donnell | |
| 7,610,548 B1 | 10/2009 | Brinkman et al. | |
| 7,689,900 B1* | 3/2010 | Fifield | G06F 21/645 715/230 |
| 2006/0136810 A1 | 6/2006 | Truong et al. | |
| 2006/0143545 A1* | 6/2006 | Reaume | G05B 23/0291 714/45 |
| 2006/0167905 A1* | 7/2006 | Liu | G06F 40/143 |
| 2006/0206502 A1* | 9/2006 | Gaurav | G06F 16/258 |

(Continued)

*Primary Examiner* — Dao Q Ho
(74) *Attorney, Agent, or Firm* — Shook, Hardy & Bacon L.L.P.

(57) ABSTRACT

A system, to persist state in a dynamic electronic form, may include a communications module to receive a request to certify a template associated with an electronic form, an attribute detector to determine that the template is associated with a restore state attribute and a certification module. The certification module may be configured to selectively grant the request to certify the template based on the restore state attribute.

14 Claims, 6 Drawing Sheets

(56) References Cited

U.S. PATENT DOCUMENTS

2007/0288857 A1* 12/2007 Boyer .................. G06F 8/31
715/762
2007/0300145 A1   12/2007 Perelman et al.
2009/0177956 A1    7/2009 Huang et al.

* cited by examiner

METHOD AND SYSTEM TO MAINTAIN THE INTEGRITY OF A CERTIFIED DOCUMENT WHILE PERSISTING STATE IN A DYNAMIC FORM

CROSS-REFERENCE TO RELATED APPLICATIONS

This application is a continuation of, and claims priority from, U.S. application Ser. No. 11/583,410, filed Oct. 18, 2006, entitled "Method and system to maintain the integrity of a certified document while persisting state in a dynamic form," the entire contents of which is herein incorporated by reference.

TECHNICAL FIELD

This application relates to a method and system to maintain integrity of a certified document while persisting state in a dynamic electronic form.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Certification of an electronic-document typically indicates that the document has been preserved to comply with the author's intent. When an author creates a certified document, the author thereby indicates to others that the author approves of the content of the document. In some existing systems, an author may specify the types of changes that are permitted and that allow the document to remain certified.

For example, suppose that a governmental agency creates a form with signature fields. When the form is complete, the agency certifies the document, allowing the users to change only form fields and sign the document. Users can fill in the form and sign the document, but if they remove pages or add comments, the document does not retain its certified status. Certifying a document thus helps to ensure that the document is not altered in a way that does not meet the author's approval.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
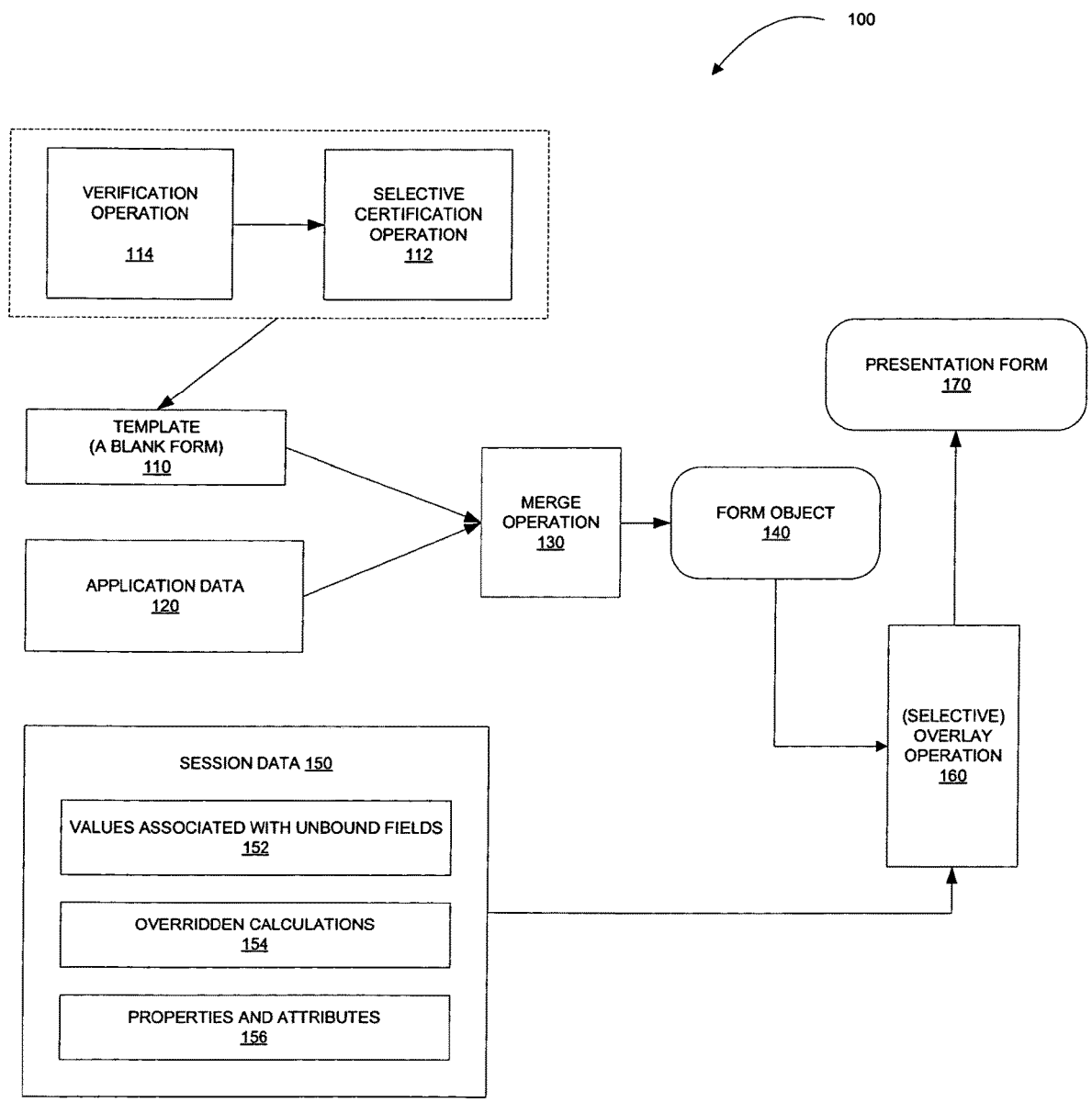
FIG. 1 shows an architecture to maintain integrity of a certified document while persisting state in a dynamic electronic form, in accordance with an example embodiment.

An electronic form may, in many cases, embody a complex "application packaged as a document" that may utilize a template-based grammar where the template associated with an electronic form defines presentation, calculations and interaction rules, while the content of the electronic form comprises the application data of a user. One example of an architecture that distinguishes between an electronic form template and electronic form content is the eXtensible Markup Language (XML) Forms Architecture (XFA).

Although the application data and the template of an electronic form are often packaged together, the application data and the template may be represented by separate entities. Thus, in order to load a previously saved electronic form, the template associated with the electronic form is merged with the application data.

Application data may include form field values that are mapped to the respective fields in the template. Such mapping determines which form field values are to be saved in an electronic form content repository and is also used to populate the fields of the template when a user requests to load the electronic form. For the purposes of this description, any data related to the electronic form that is not designated to be saved as part of the user's application data is referred to as attributes and properties of the electronic form or session data of the electronic form. Session data may include, for example, values associated with unbound fields, overridden calculations, as well as any visual characteristics of the electronic form. It may be beneficial to preserve the purity of application data of an electronic form by avoiding mixing the application data with any session data of the electronic form.

Because the template and the application data of an electronic form may be stored as separate entities, the template and the application data are merged together when a user requests to load the electronic form. In order to persist a more complete state of an electronic form, an author may be permitted to designate at least some attributes and properties of the electronic form as persistent, such that at least some session data is restored when a previously saved electronic form is loaded, some or all session data items may be stored separately from the application data. The stored session data, sometimes termed as persistent session data, may be overlaid onto the form object subsequent to the merging of the template with the application data.

In an architecture that distinguishes between an electronic form template and electronic form content, a certificate (e.g., a certifying signature) may be associated with the form's template, but not necessarily with any of the form field data. For example, an author may desire to certify a template but nonetheless permit a user to alter some or all of the form's attributes and characteristics that are outside of the user data (e.g., the color of the border, the size of a field, etc.), so that certain changes to the form's state may persist between editing sessions without invalidating the certificate.

In one example embodiment, the template for a certified document may be designed to include logic to verify every form state change (e.g., every item from the session data) that needs to be restored. In order to accomplish this, in an example embodiment, the persistent session data for a certified electronic form may be first manually saved using either scripting or a declarative solution, and then manually restored using either scripting or a declarative solution. For non-certified documents, in one example embodiment, the logic required to restore the state information does not need to be included in the template definition and thus the saving and restoring of the state information for the electronic form may be performed automatically.

In order to maintain the integrity of a certifying signature, while still allowing session data to persist, a method and system may be provided, in one example embodiment, to examine the template associated with the subject electronic form for an indication of a presence or an absence of a session data integrity verification mechanism associated with the template. As mentioned above, in one example embodiment, such verification mechanism may comprise a script to manually restore persistent session data.

An indication of a session data integrity verification mechanism may be provided with an electronic form template in a variety of ways and utilizing a variety of techniques, as would be understood by a person of ordinary skill in the art. For the purposes of this description, such an indication will be referred to as a restore state attribute.

In one example embodiment, a manual setting of the restore state attribute may be used to indicate that the template includes a state integrity verification mechanism. An "automatic" setting of the restore state attribute may be used to indicate that the template does not include a state integrity verification mechanism.

According to one example embodiment, an author of a template may be permitted to certify the template only if the restore state attribute of the template is set to manual. Setting the restore state attribute of the template to manual may include, in one example embodiment, coding additional restore and validate actions into the template. In some example embodiments, when a user requests to load a previously saved electronic form, the persistent session data of the form may be restored only if the restore state attribute of the template is set to manual, such that the restore and validate actions coded into the template may be performed during a restore state process that overlays session data onto the form object.

An example architecture 100 to maintain integrity of a certified document while persisting a state of an electronic form is illustrated in FIG. 1. Referring to FIG. 1, a template 110 may be certified by the author of the template via an example selective certification operation 112. As discussed above, a template may be configured to persist at least some session data associated with the electronic form. In one example embodiment, the selective certification operation 112 may certify a template only if the restore state attribute of the template is set to manual, based on information provided by verification operation 114. Conversely, the selective certification operation 112 may deny an author's request to certify a template if the results of the verification operation 114 indicate that the restore state attribute associated with the template 110 is set to automatic.

When a user requests to load a previously saved electronic form, whether certified or uncertified, in one example embodiment, the template 110 associated with the electronic form may be merged with the user's content, e.g., with application data 120, utilizing an example merge operation 130. The merge operation 130, in one example embodiment, may result in an electronic form object 140. The electronic form object 140, therefore, includes the saved application data associated with the electronic form.

Subsequent to the merge operation 130, in one example embodiment, the electronic form object 140 may be processed further by an overlay operation 160. The overlay operation 160 may overlay persistent session data 150 onto the electronic form object 140 in order to restore the state of the electronic form. As mentioned above, the session data 150 may include values of electronic form fields that are not reflected in the application data 120, e.g., the values of unbound electronic form fields 152, values associated with overridden calculations 154, characteristics that affect the appearance of the electronic form 156, as well as other data values that are not part of the application data 120.

The overlay operation 160, in one example embodiment, may result in a presentation electronic form 170 that reflects not only the user's application data, but also the session data 150 of the electronic form.

It will be noted that, in one example embodiment, the architecture 100 to maintain integrity of a certified document while persisting state in a dynamic electronic form may be implemented to include a so-called unconditional certification operation. An unconditional certification operation, unlike the selective certification operation 112, may be configured to permit an author to certify a template without first examining a template for an indication of a session data verification mechanism. Thus, in one example embodiment, the template 110 may be a certified template that has an associated restore state attribute set to automatic.

In order to maintain integrity of a certified document, in one example embodiment, the overlay operation 160 may be configured as a selective overlay operation. A selective overlay operation may include additional verification operations that are executed prior to the overlaying of the session data 150 onto the electronic form object 140. When the overlay operation 160 is configured as a selective overlay operation, it is first determined whether the template associated with the form object 140 is a certified template. If the template associated with the form object 140 is a certified template, then the overlay operation 160 restores the session data (e.g., by overlaying the session data 150 onto the form object 140) only if the restore state attribute of the template is set to manual. It will be noted that these additional verification operations may be performed by a functional module associated with the overlay operation 160 or by separate one or more functional modules.

Returning to FIG. 1, the overlay operation 160 may access session data 150 and utilize it to restore the state of the electronic form. If it is determined that the template 110 is certified and that the restore state attribute of the template 110 is set to automatic, the overlay operation 160 is not performed and the session data is not restored.

The overlay operation 160, whether it has been configured as a selective overlay operation or a non-selective overlay operation, may result in a presentation electronic form 170. The presentation electronic form 170, in one example embodiment, may be rendered in a Portable Document Format (PDF).

Figure 2:
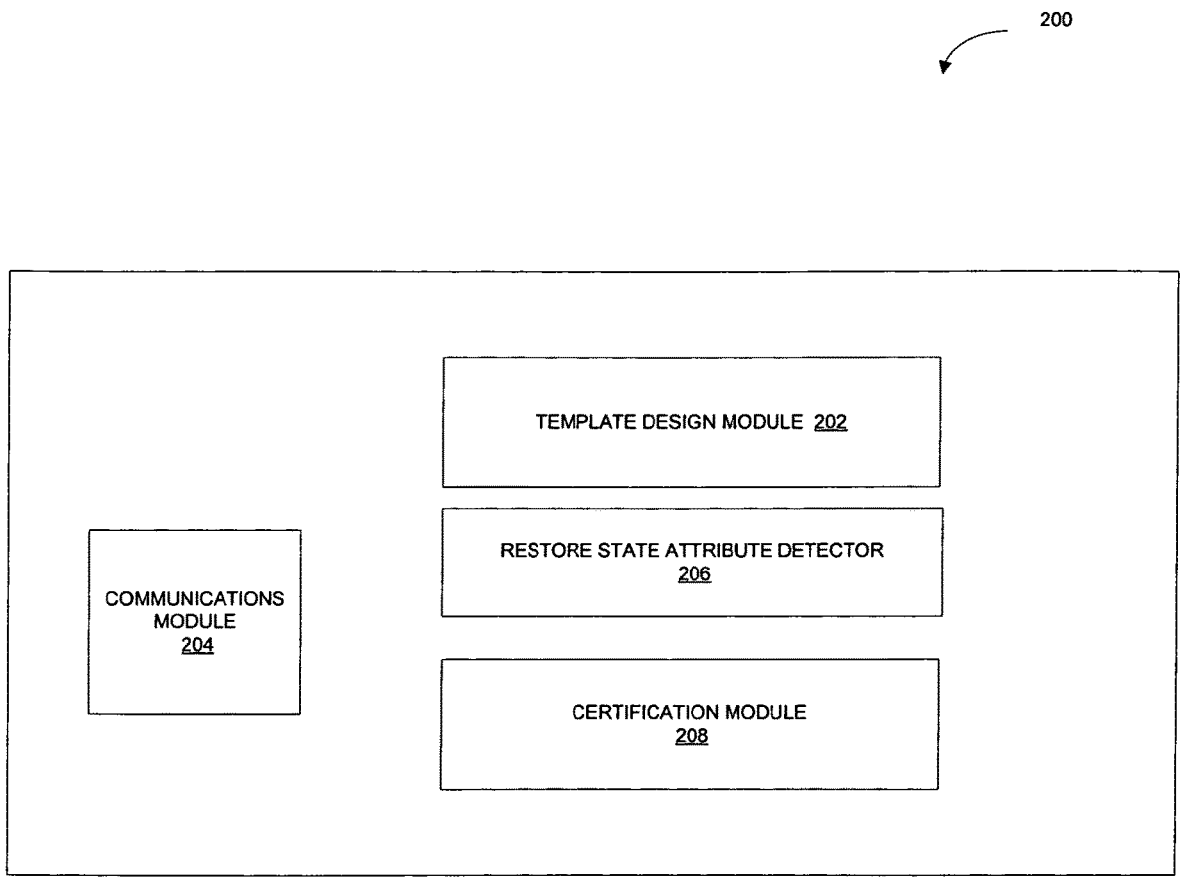
FIG. 2 is a block diagram illustrating a system, in accordance with an example embodiment, to generate a template associated with an electronic form.

An example system 200 to generate a template associated with an electronic form is illustrated in FIG. 2. The system 200, according to one example embodiment, comprises a template design module 202, a communications module 204, a restore state attribute detector 206 and a certification module 208.

The template design module 202 may be utilized to define various components of the template, such as data fields, text, etc. The template design module 202 may also be utilized to indicate that session data of an electronic form associated with the template is designated as persistent session data. Persistent session data may be associated with a restore state attribute of the template.

The author may set the restore state attribute to indicate that the saved session data is to be overlaid onto the form object automatically, according to a default overlay mechanism associated with the template. This setting of a restore attribute may be termed automatic. Alternatively, in one example embodiment, the restore state attribute may be set to indicate that the session data is to be restored by performing restore and validate actions that were manually scripted into the template by the author. A restore script may specify each item of the session data that may be overlaid onto the form object, so that only the specified session data items is restored, based on the outcome of a respective verification operation. This setting of a restore attribute may be termed manual.

As mentioned above, the author of a template may be permitted to certify the template such that a user of an associated electronic form may be able to modify form field values without invalidating the certifying signature. The communications module 204 may be configured to receive a request to certify the template. The request may originate from any user (e.g., from a human operator, as well as from an application or a process).

The request to certify the template may be processed, in one example embodiment, by the certification module 208 that cooperates with the restore state attribute detector 206. The restore state attribute detector 206, in one example embodiment, may analyze the template to determine whether the template has an associated restore state attribute and, if so, determine the value of the restore state attribute. The restore state attribute detector 206 may provide the results of this analysis to the certification module 208. The certification module may selectively certify the template based on the information provided by the restore state attribute detector 206. Example operations performed by the system 200 may be described with reference to FIG. 3.

Figure 3:
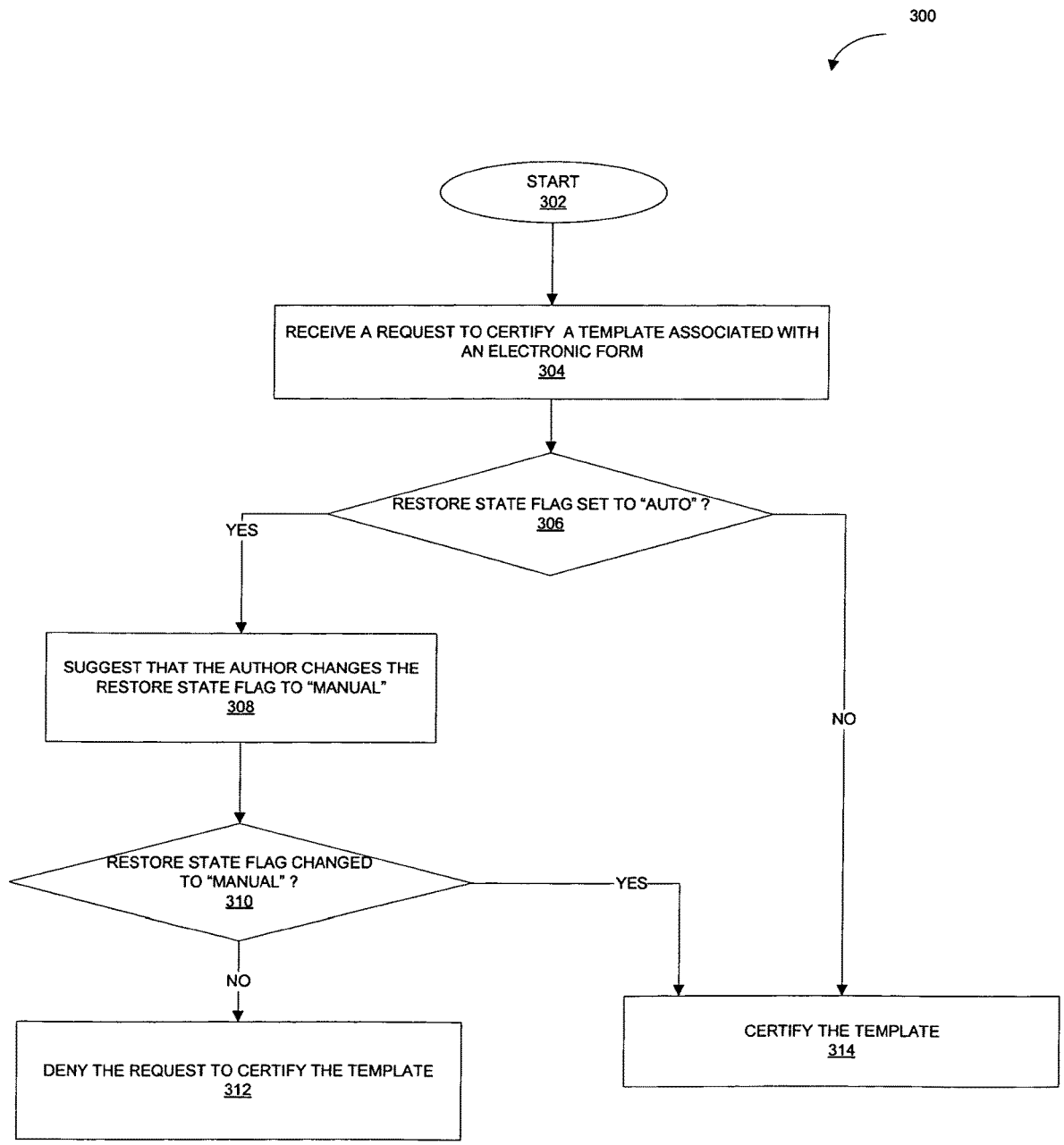
FIG. 3 is a flow chart illustrating a method, in accordance with an example embodiment, to selectively certify an electronic document.

FIG. 3 is a flow chart illustrating a method 300, in accordance with an example embodiment, to selectively certify an electronic document. The method 300 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2 described above.

As shown in FIG. 3, the method 300 commences at operation 302. At operation 304, the communications module 204 receives a request to certify a template. In response to the request, an attribute detector (e.g., the restore state attribute detector 206) determines whether the template indicates that a state of an associated electronic form is to persist between editing sessions (e.g., by determining whether the template has an associated restore state attribute). If the restore state attribute detector 206 determines that the template has an associated restore state attribute, the restore state attribute detector 206 next determines the value of the restore state attribute. If the value of the restore state attribute associated with the template is set to automatic, determined at operation 306, the certification module 208 may deny the request to certify the template.

In one example embodiment, before the request to certify the template is denied, the author may be presented, at operation 308, with a suggestion to set the restore state attribute associated with the template to manual. As mentioned above, with respect to a template design module 202 of FIG. 2, a manual setting of the restore state attribute indicates, in one example embodiment, that the template includes one or more coded actions to restore and validate specific items of the saved session data. Thus, in order to set the restore state attribute to manual, the author may need to code such restore and verification actions into the template.

If it is determined, at operation 310, that the restore state attribute associated with the template has been set to manual in response to the suggestion, the certification module 208 may certify the template at operation 314. Otherwise, at operation 310, the certification module 208 denies the request to certify the template.

The restore state attribute detector 206 may determine, at operation 306, that the restore state attribute associated with the template is set to manual. The method 300 then continues directly to operation 314, where the certification module 208 certifies the template.

As discussed above a system to generate a template, in one example embodiment, may be configured to permit an author to certify a template without verifying the value of an associated restore state attribute. A template that has been certified utilizing such system may have an associated restore state attribute set to automatic. In order to maintain the integrity of a certified electronic document, an example system may be configured to verify the value of the restore state attribute prior to authorizing an operation to restore session data of an electronic form. An example system may be described with reference to FIG. 4.

Figure 4:
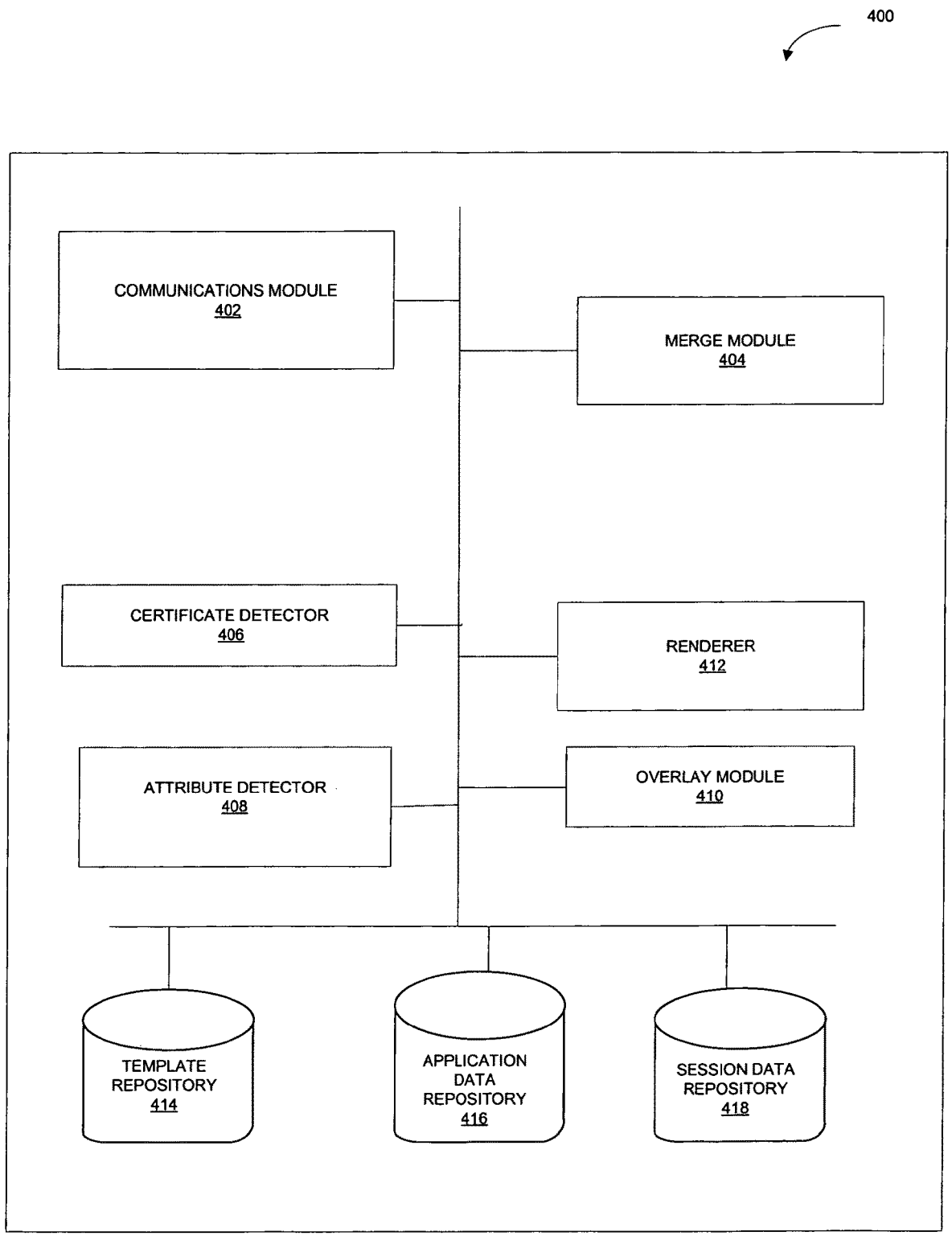
FIG. 4 is a block diagram illustrating a system, in accordance with an example embodiment, to process a request to load an electronic form.

FIG. 4 is a block diagram illustrating a system 400, in accordance with an example embodiment, to process a request to load an electronic form. In an example embodiment, the system 400 comprises modules of an electronic form processing application (e.g., an XFA processing application). The system 400 may comprise a communications module 402, a merge module 404, a certificate detector 406, an attribute detector 408, an overlay module 410 and a renderer 412. These and other modules of the system 400 may utilize data stored in a template repository 414, an application data repository 416 and a session data repository 418. It will be noted that the template repository 414, the application data repository 416 and the session data repository 418 may be part of the system 400 or may be part of a separate system that is in communication with the system 400.

The communications module 402 may be configured to receive communications from a user, such as a request from a user to load an electronic form or any data input. When the communications module 402 receives a request to load an electronic form, in one example embodiment, the communications module 402 passes control to the merge module 404. The merge module 404 may be configured to obtain the template associated with the requested electronic from the template repository 414, application data associated with the electronic form from the application data repository 416 and then merge the template with the application data.

The merge module 404 may also be configured, in one example embodiment, to determine that session data, e.g., data that reflects the state of the form and that is not part of the application data, was designated to persist between editing sessions. Session data may be obtained from the session data repository 418. The obtained session data may be provided to the overlay module 410. The overlay module 410 may be configured to overlay the session data onto a form object that represents the template merged with the application data.

In one example embodiment, the certificate detector 406 may be configured to determine whether the template associated with the electronic form is a certified template. If the certificate detector 406 determines that the subject electronic document is associated with a certified template, the overlay module 410 may cooperate with the attribute detector 408 to determine whether an overlay operation should be performed.

The attribute detector 408 may be configured to perform additional verification to determine whether the certified template includes a session data verification indication. In one example embodiment, the attribute detector 408 may examine the value of the restore state attribute associated with the template and provide this information to the overlay module 410. The overlay module 410 may then selectively perform the overlay operation based on the received value of the restore state attribute.

If the restore state attribute of the template is set to automatic, the overlay module 410 may restore the saved session data automatically, according to a default overlay mechanism associated with the template. If the restore state attribute of the template is set to manual, the overlay module 410 may perform restore and validate actions that were manually scripted into the template, so that only those items from the saved session data that successfully pass a respective verification operation may be restored.

In order to complete the processing of the request to load the electronic form, the system 400 may utilize the renderer 412. The renderer 412 may be configured to render the requested electronic form to the user, e.g., as a PDF document. Example operations performed by the system 400 may be described with reference to FIG. 5.

Figure 5:
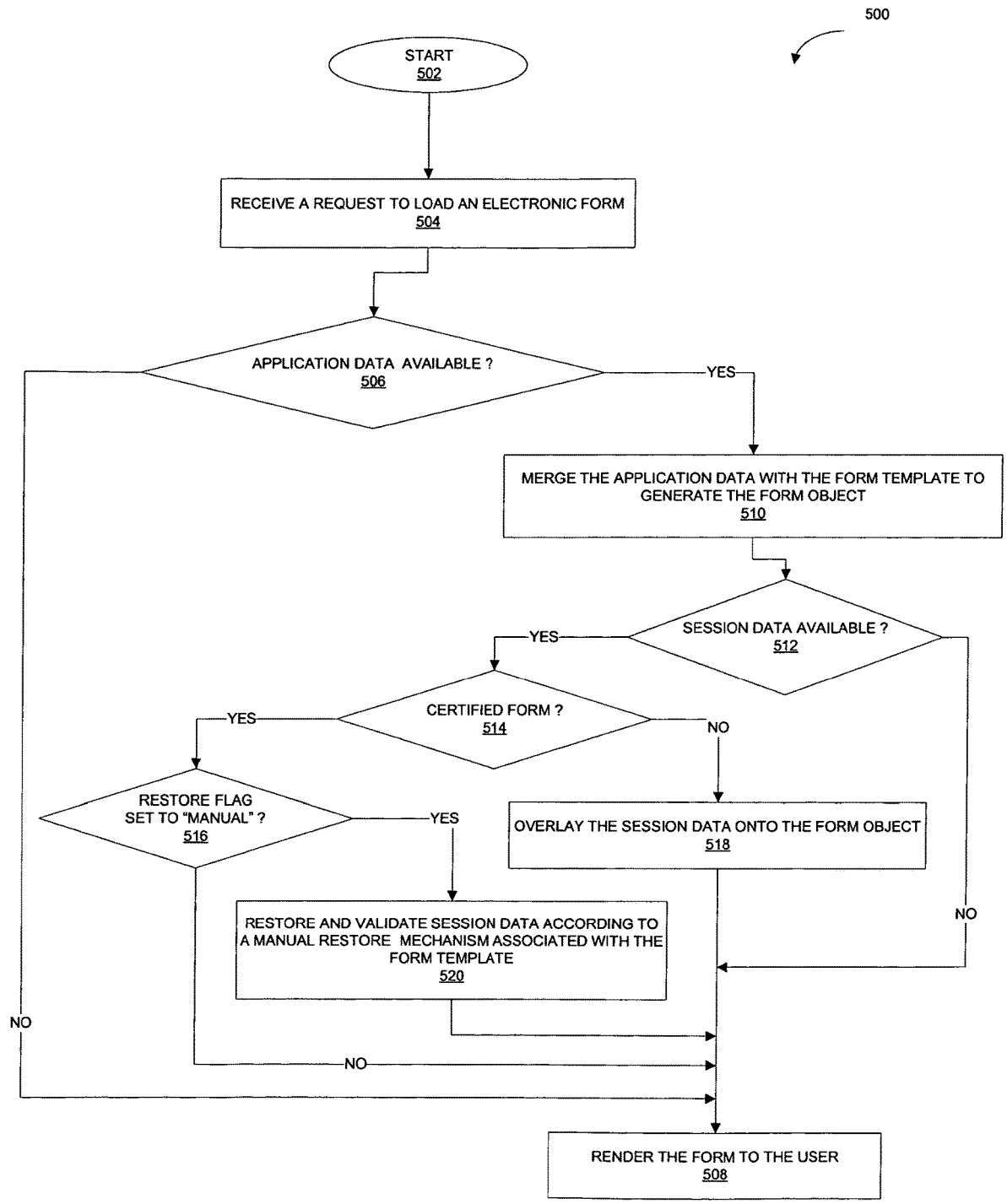
FIG. 5 is a flow chart illustrating a method, in accordance with an example embodiment, to process a request to load an electronic form.

FIG. 5 is a flow chart illustrating a method 500, in accordance with an example embodiment, to process a request to load an electronic form. The method 500 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 4 described above.

As shown in FIG. 5, the method 500 commences at operation 502. At operation 504, the communications module 402 receives a request to load an electronic form. If no application data is available for the electronic form, which is determined at operation 506, the renderer 412 renders an associated template, which may be a blank or unfilled electronic form. The rendering is performed at operation 508.

If it is determined, at operation 506, that application data is available for the requested electronic form, the merge module 404 merges, at operation 510, the template associated with the electronic form and application data associated with the electronic form to generate a form object. At operation 512, the processing logic determines whether the electronic form has any saved session data. Operation 512 may be performed, in one example embodiment, by the overlay module 410. If it is determined that no saved session data is available, the method 500 proceeds to operation 508. At operation 508, the renderer 412 renders the electronic form utilizing the form object. The rendered form includes any saved application data associated with the form.

If it is determined, at operation 512, that that persisting session data is available, the certificate detector 406 determines, at operation 514, whether the subject electronic document is associated with a certified template. If the subject electronic document is associated with a uncertified template, the overlay module 410 overlays, at operation 520, the session data onto the form object generated by the merge module 404.

If the subject electronic document is associated with a certified template, the attribute detector 408 may perform additional verification, at operation 516, to determine whether the restore state attribute associated with the certified template is set to manual. If it is determined, at operation 516, that the value of the restore state attribute is set to manual, the overlay module 410 may perform restore and validate actions that were manually scripted into the template, at operation 518, so that only those items from the saved session data that successfully pass a respective validation operation may be restored.

If it is determined, at operation 516, that the value of the restore state attribute is not set to manual, the overlay module 410 does not overlay the session data onto the form object. The method 500 instead proceeds directly to the rendering operation 508 and the electronic form is rendered in a manner that does not manifest persisting session data.

It will be noted that, in some example embodiments the operations of the method 500 may be performed in an order that is different from the order described above. For example, the processing logic may be configured to determine whether the electronic form has any saved session data first, after which the certificate detector 406 may determine whether the subject electronic document is associated with a certified template.

It will be noted that, although some example embodiments of the invention have been described in the context of the XFA architecture, the techniques herein may be utilized advantageously with a variety of applications related to providing electronic forms to users.

Figure 6:
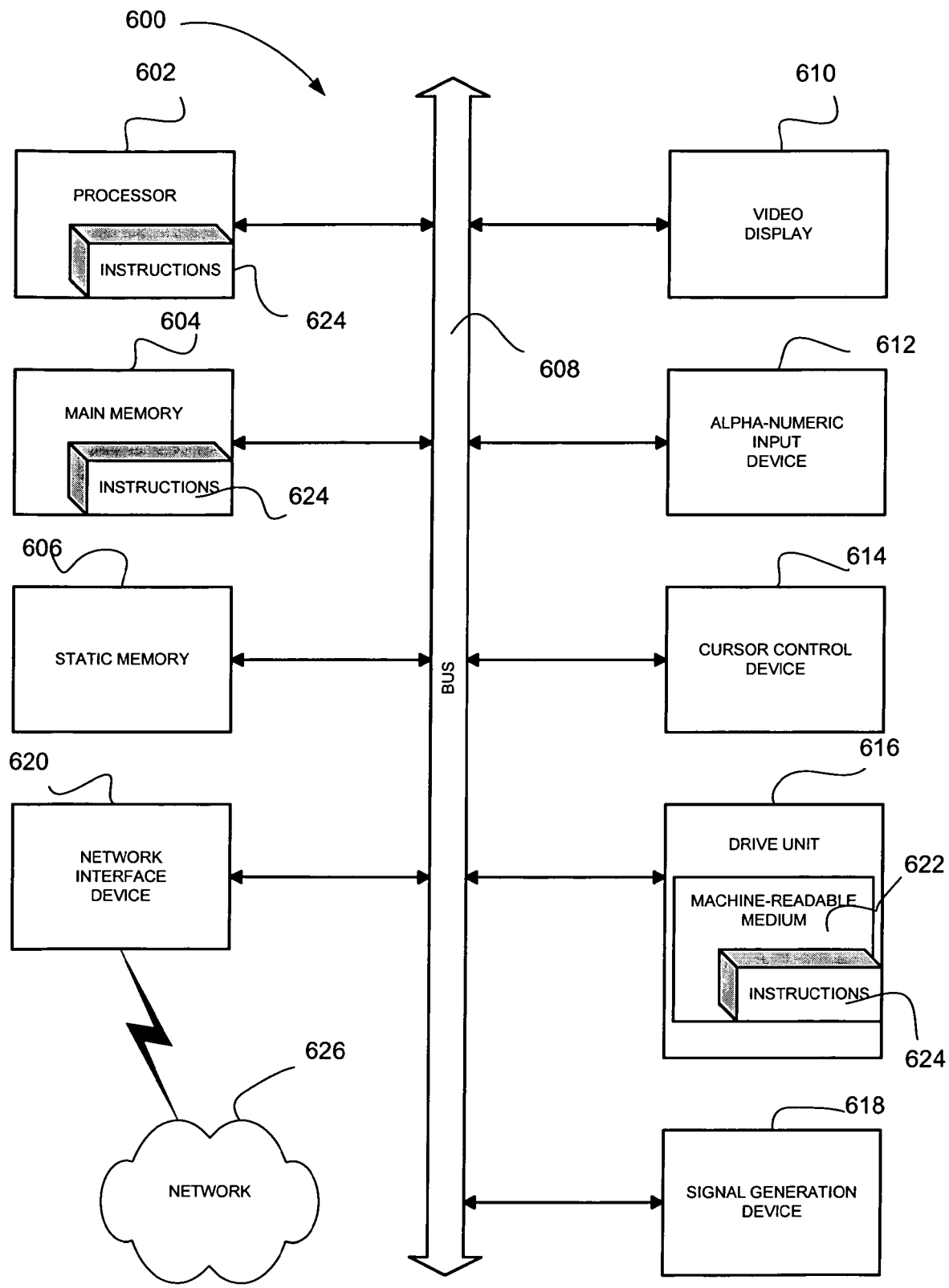
FIG. 6 illustrates a diagrammatic representation of a machine in the example form of a computer system within which a set of instructions, for causing the machine to perform any one or more of the methodologies discussed herein, may be executed.

FIG. 6 shows a diagrammatic representation of a machine in the example electronic form of a computer system 600 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Having thus described the invention, what is claimed is:

1. A method comprising:
    receiving a request to certify a template associated with an electronic form;
    based on receiving the request to certify the template, accessing a restore state attribute of the template, wherein the restore state attribute is configurable to a first value and second value, the first value is a manual setting and the second value is an automatic setting, the restore state attribute is configurable to support maintaining the integrity of a certifying signature;
    determining that a value of the restore state attribute is the first value that indicates that the template is associated with session data that can be altered and persisted without invalidating the certifying signature of the template; and
    based on determining the value of the restore state attribute, executing a coded script that manually restores the session data to persist the session data without invalidating the certifying signature of the template, wherein manually restoring the session data is based on the coded script that is manually scripted into the template; and
    granting the request to certify the template.

2. The method of claim 1, wherein the manual setting is a configuration associated with the coded script to restore session data that has been altered.

3. The method of claim 1, wherein the electronic form is an application packaged as a document that includes the architecture of the electronic form that certifies the template separately from the electronic form content, wherein the architecture is an eXtensible Markup Language (XML) Forms architecture (XFA).

4. The method of claim 1, wherein the coded script comprises one or more actions coded into the template, the one or more actions include a restore action and a validate action.

5. The method of claim 4, wherein the restore action specifies items of the session data to overlay onto the electronic form such that only specified session data items are restored.

6. The method of claim 1, further comprising:
    merging application data with the template associated with the electronic form to generate an electronic form object including saved application data associated with the electronic form.

7. The method of claim 1, wherein when the value of the restore state attribute is the second value, the session data that has been altered is not restored.

8. The method of claim 1, further comprising:
    based on determining that the value of the restore state attribute corresponds to the automatic setting, suggesting to set the restore state attribute to the manual setting such that the value of the restore state attribute indicates that the template is associated with session data that can be altered and persisted without invalidating the certifying signature of the template; and
    receiving an indication to set the restore state attribute to the manual setting.

9. The method of claim 1, wherein the session data comprises values of one or more of the following: unbound fields, overridden calculations, and visual characteristics of the electronic form.

10. The method of claim 1, wherein the electronic form is in a Portable Document Format (PDF).

11. A computing system comprising:
    one or more processors; and one or more non-transitory computer-readable storage media, coupled with the one or more processors, having instructions stored thereon, which, when executed by the one or more processors, cause the computing system to execute:

receiving a request to certify a template associated with an electronic form;

based on receiving the request to certify the template, accessing a restore state attribute of the template, wherein the restore state attribute is configurable to a first value and a second value, the first value is a manual setting and the second value is an automatic setting, the restore state attribute is configurable to support maintaining the integrity of a certifying signature;

determining that a value of the restore state attribute is the first value that indicates that the template is associated with session data that can be altered and persisted without invalidating the certifying signature of the template; and based on determining the value of the restore state attribute, executing a coded script that manually restores the session data to persist the session data without invalidating the certifying signature of the template, wherein manually restoring the session data is based on the coded script that is manually scripted into the template; and granting the request to certify the template.

12. The system of claim 11, wherein the electronic form is an application packaged as a document that includes the architecture of the electronic form that certifies the template separately from the electronic form content, wherein the architecture is an eXtensible Markup Language (XML) Forms architecture (XFA).

13. The system of claim 11, further comprising:

based on determining that the value of the restore state attribute, suggesting to set the restore state attribute to the manual setting such that the value of the restore state attribute indicates that the template is associated with session data that can be altered and persisted without invalidating the certifying signature of the template; and receiving an indication to set the restore state attribute to the manual setting.

14. The system of claim 11 further comprising:

merging application data with the template associated with the electronic form to form an electronic form object including saved application data associated with the electronic form.

* * * * *